UNITED STATES PATENT OFFICE.

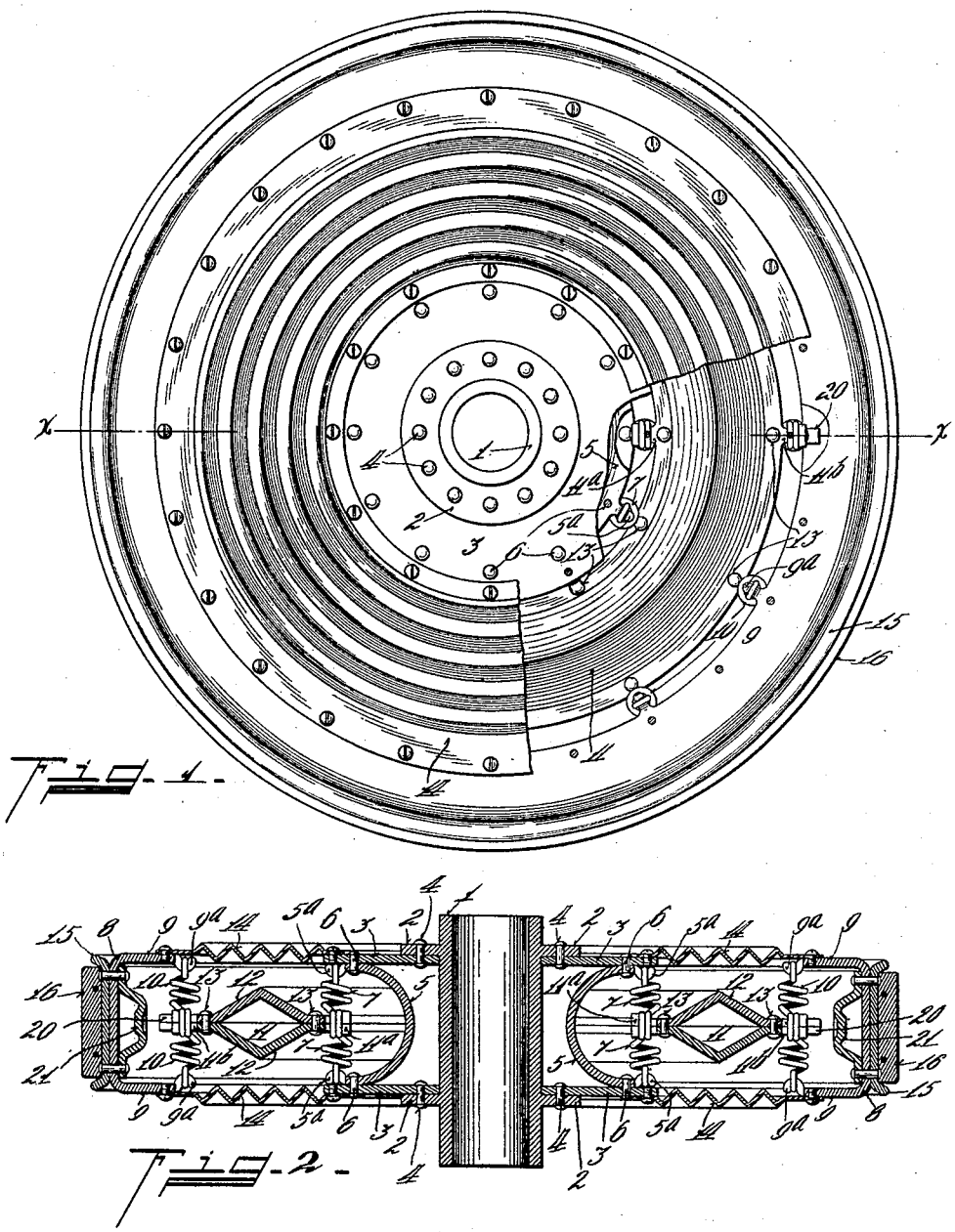

ALFRED J. SWING, OF CINCINNATI, OHIO, ASSIGNOR TO THE AUTO-SPRING WHEEL COMPANY, OF CINCINNATI, OHIO, A CORPORATION OF OHIO.

WHEEL.

1,018,088.   Specification of Letters Patent.   Patented Feb. 20, 1912.

Application filed January 9, 1911. Serial No. 601,730.

*To all whom it may concern:*

Be it known that I, ALFRED J. SWING, a citizen of the United States, residing at Cincinnati, in the county of Hamilton and State of Ohio, have invented certain new and useful Improvements in Wheels, of which the following is a specification.

My invention relates to an improvement in spring wheels.

One of the objects of the invention is to provide a spring supported rim member, adapted to form a substitute for pneumatic tires.

Another object of the invention is to provide a dust-proof structure.

Another object of the invention is to provide means for supporting the rim member on two sets of springs, one of which sets of springs is preferably weaker than the other set, the relative tensions being so selected that the weaker set of springs will take up all ordinary strains and vibrations, the stronger springs being relied upon to provide for extraordinary stresses.

The features of the invention will be more fully set forth in the description of the accompanying drawings, forming a part of this specification, in which:—

Figure 1 is a side elevation of the wheel. Fig. 2 is a section on line $x, x$, Fig. 1.

1 represents the hub having parallel outwardly extending circumferential flanges 2. To said flanges I secure a circumferential hub member comprising the vertical parallel walls 3, extending radially outward relative to the hub, and attached to the flanges 2 by bolts 4. Preferably, the outer edges of these walls are reinforced and mutually supported by the annular concave ring 5 secured upon the inside of said walls 3, by the bolts 6.

7 represent spiral springs, the ends of which are secured to the projections 5ª of the concave ring 5, so that said springs span said ring and extend parallel with the axis. These springs are disposed at suitable regular intervals around the circumference of the hub member.

8 represents a circumferential rim member having inwardly extended parallel walls 9 disposed respectively in the planes of the walls 3 of the hub member.

10 represent spiral springs, the ends of which are secured to the projections 9ª of the walls 9, so that said springs span the rim member in directions parallel with the springs 7, the rim member being adjusted and the springs 10 disposed, so that each spring 10 will be in radial alinement with one of the springs 7. The rim and hub springs individually could be one integral spring, the meeting ends of which are connected together.

11 represents a circumferential spring connecting member. Preferably, it is formed of the two angle irons 12, the meeting ends of which are secured together by bolts 13, so as to form a unitary circumferential member, substantially diamond-shaped in cross section. The springs 7 are connected to projections 11ª at the inner apex of this diamond-shaped structure, and the springs 10 are connected to projections 11ᵇ at the outer apex of said structure, the connections being formed at the intermediate portions of said springs.

The space between the walls of the hub and rim members is closed in by means of the corrugated flexible dust-shields 14, preferably formed of leather or other suitable material. As will be seen from the drawings, the dust-shields are circumferential strips secured to the parallel walls 9, 3, respectively, the corrugations permitting of relative movements between the hub and rim members.

15 represents the concave annular tire support secured to the outer peripheral face of the rim member 8.

16 represents the tire secured to the support 15.

Preferably, the hub member springs 7 are of greater tension than the rim member springs 10, so that ordinary strains and vibrations will be taken up by the springs 10 without appreciably affecting the springs 7, but in cases of extraordinary stresses the excessive strains will be taken up by the springs 7. To facilitate this action I preferably provide extension 20 on the outer periphery of the members 11, disposed adjacent to a buffer annulus 21, fixed to the inner periphery of the rim member 8, so that when unusual strains are encountered, the springs 10 will yield, whereby the member 11 will encounter and seat upon member 21, thus bringing the springs 7 into action. But this relationship could be transposed.

It will be seen that the coils of the springs extend upon both sides of the member 11 at its opposite edges of attachment to the springs, so that the spring influence is not only realized in the radial plane of the wheel but in transverse or lateral planes, thus taking care of strains applied to the rim member from any angle.

This wheel is very cheap, easily constructed, efficient, and entirely dust-proof.

Having described my invention, I claim:—

1. In a spring wheel, a hub, a circumferential hub member secured thereto comprising outwardly extended walls, a series of coil springs spanning said walls parallel with the axis, a circumferential rim member having inwardly extending walls disposed respectively in the planes of the hub member walls, a series of coil springs spanning the walls of said rim member, and means connecting together the medial portions of said radially alined coil springs.

2. In a spring wheel, a hub, a circumferential hub member secured thereto comprising outwardly extended walls, a series of coil springs spanning said walls parallel with the axis, a circumferential rim member having inwardly extending walls disposed respectively in the planes of the hub member walls, a series of coil springs spanning the walls of said rim member, and an annular member intermediate the hub and rim springs and to which said springs are secured at their medial portions.

3. In a spring wheel, a hub, a circumferential hub member secured thereto, comprising outwardly extended walls, a series of coil springs spanning said walls parallel with the axis, a circumferential rim member having inwardly extending walls disposed respectively in the planes of the hub member walls, a series of coil springs spanning the walls of said rim member, an annular member intermediate the hub and rim springs to which said springs are secured at their medial portions, and dust-shields attached to the respectively adjacent walls of the rim and hub members.

4. In a spring wheel, a hub, a circumferential hub member secured thereto comprising outwardly extended walls, a series of springs spanning said walls parallel with the axis, a circumferential rim member having inwardly extending walls disposed respectively in the planes of the hub member walls, a series of springs spanning the walls of said rim member, and means connecting said springs, one of said sets of springs being relatively weaker than the other.

5. In a spring wheel, a hub, a circumferential hub member secured thereto, a circumferential rim member, said rim and hub members being concentrically disposed, their opposing peripheries having circumferential grooves forming separated edges, coil springs spanning said edges, a circumferential member interposed and mutually engaging the medial portions of said two sets of coil springs, and flexible dust-guards attached to the opposite adjacent faces of said hub and rim members.

6. In a spring wheel, a circumferential hub member, springs supported thereby parallel with the wheel axis, a circumferential rim-member, springs supported thereby parallel with the wheel axis, rigid means connecting the two sets of springs, the springs of one set being relatively weaker than the springs of the other set.

7. In a spring wheel, a circumferential hub member, springs supported thereby parallel with the wheel axis, a circumferential rim member, springs supported thereby parallel with the wheel axis, rigid means connecting the two sets of springs, the springs of one set being relatively weaker than the springs of the other set, and stopping devices coöperating with the weaker set of springs to limit the eccentric shifting of the spring connecting means in further straining the weaker springs.

In testimony whereof, I have hereunto set my hand.

ALFRED J. SWING.

Witnesses:
 OLIVER B. KAISER,
 CLARENCE B. FOSTER.